United States Patent [19]
Gregoire et al.

[11] Patent Number: 6,082,741
[45] Date of Patent: Jul. 4, 2000

[54] RESILIENT PIPE GASKET

[75] Inventors: Bernard Gregoire, Mississauga; Pardeep K. Sharma, Brampton, both of Canada

[73] Assignee: Ipex Inc., Toronto, Canada

[21] Appl. No.: 09/015,064

[22] Filed: Jan. 28, 1998

Related U.S. Application Data

[63] Continuation-in-part of application No. 08/780,007, Dec. 23, 1996, abandoned.

[30] Foreign Application Priority Data

Nov. 28, 1996 [CA] Canada ................................... 2191537

[51] Int. Cl.[7] ...................................................... F16J 15/32
[52] U.S. Cl. .......................... 277/612; 277/604; 277/607; 277/615; 285/231; 285/369; 285/903
[58] Field of Search ..................................... 277/602, 604, 277/607, 608, 611, 612, 615, 616, 625, 626; 285/231, 369, 903, 910, 110

[56] References Cited

U.S. PATENT DOCUMENTS

| | | | |
|---|---|---|---|
| 2,882,073 | 4/1959 | James ........................................ | 285/110 |
| 3,493,237 | 2/1970 | Kleindienst ............................... | 277/602 |
| 3,573,871 | 4/1971 | Warner ...................................... | 285/110 |
| 3,857,589 | 12/1974 | Oostenbrink ............................. | 285/110 |
| 4,223,895 | 9/1980 | Roberts, Jr. et al. ..................... | 277/625 |
| 4,458,904 | 7/1984 | Delhaes .................................... | 277/207 A |
| 4,850,602 | 7/1989 | Goldstein et al. ....................... | 277/205 |
| 4,946,206 | 8/1990 | Roe et al. ................................. | 285/369 |
| 5,305,903 | 4/1994 | Harde ....................................... | 285/910 |
| 5,324,083 | 6/1994 | Vogelsang ................................ | 285/110 |
| 5,415,436 | 5/1995 | Claes et al. .............................. | 285/110 |

FOREIGN PATENT DOCUMENTS 8204331  6/1984  Netherlands ............................ 277/602

*Primary Examiner*—Daniel G. DePumpo
*Attorney, Agent, or Firm*—Riches, McKenzie & Herbert

[57] ABSTRACT

A resilient gasket is disclosed for providing a seal between corrugated pipes having a plurality of concentric ribs on their outer surfaces, such as drain and sewer pipes to be buried in soil. The gasket comprises a base which is received around a first pipe over top of a rib adjacent an end of the first pipe, with an inner surface adapted to mate with a radially outer surface of the rib, and with legs adapted to extend along forward and rearwardly-sloped faces of the rib. The outer surface of the base is provided with sealing elements to engage the inner surface of the bell adjacent the end of a second pipe. The gasket also has a flap extending outwardly and forwardly from the forwardly extending leg. The flap and the forward leg form a V-shaped member. The flap engages the inner surface of the bell when the first pipe is inserted into the second pipe, and the gasket is rotated rearwardly relative to the rib. When the flap engages the inner surface of the bell, it prevents further rearward displacement of the gasket relative to the rib, thus preventing displacement of the gasket from the rib. The gasket also helps prevent gasket blowout during periods of unusually heavy water flow through the pipes.

19 Claims, 4 Drawing Sheets

RESILIENT PIPE GASKET

This application is a continuation-in-part of U.S. patent application Ser. No. 08/780,007, filed on Dec. 23, 1996 abandoned.

FIELD OF THE INVENTION

This invention relates to gaskets for forming at least soil-tight joints between pipes or pipe fittings.

BACKGROUND OF THE INVENTION

Pipes having outer corrugated surfaces are known for use as drain and sewer pipes to be buried in soil. To provide at least a soil-tight seal, and preferably a water-tight seal, between two lengths of pipe, a gasket is provided extending circumferentially around the outer surface of a first pipe which is to be inserted into the bell of a second pipe.

However, the disadvantage exists that prior art gaskets on an outer surface of a corrugated pipe are easily displaced during insertion of the first pipe into the bell of the second pipe. This results in poorly sealed joints between pipes.

An Additional disadvantage exists that gaskets for drain and sewer pipes are typically fitted in the valleys between corrugation ribs and require relatively large volumes of gasket material. Thus, it is difficult to obtain sufficient compression because of the relative flexibility of the bell of the second pipe. This makes the gasket less likely to resist "blowout" forces during times of unusually large water flow through the pipes. High water flow results in pressure increases which cause displacement of the gasket from its preferred position between the two pipes, again resulting in a poorly sealed joint between pipes.

SUMMARY OF THE INVENTION

Accordingly, it is an object of the present invention to at least partially overcome the disadvantages of the prior art discussed above.

Therefore, it is one object of the present invention to provide a resilient pipe gasket for sealing joints between corrugated pipes.

It is another object of the present invention to provide a resilient pipe gasket for corrugated pipes which will not become displaced during joining of two pipes.

It is yet another object of the present invention to provide a resilient pipe gasket which will not become blown out from a joint between two pipes during periods of relatively higher water pressure in the pipes.

Accordingly, in one of its broad aspects, the present invention provides a resilient pipe gasket comprising: (a) a base adapted to be received on an outer surface of a first pipe; wherein the outer surface of the first pipe has at least one circumferentially extending rib adjacent to an end thereof, and the first pipe is adapted to mate with a second pipe with the end of the first pipe being received in an end of the second pipe; and wherein the base has an inner surface adapted to be seated on one of the ribs; (b) sealing means provided on an outer surface of the base, the sealing means being adapted to sealingly engage a first inner surface of the second pipe; (c) a forward leg extending inwardly from the base and adapted to extend along a forward side of the rib, the forward side of the rib facing the end of the first pipe; and (d) a flap extending outwardly and forwardly from an inner portion of the forward leg toward the end of the first pipe, the flap having an engaging surface at an outer portion of the flap adapted to engage a second inner surface of the second pipe during rotation in a rearward direction of the gasket about the rib.

In another one of its broad aspects, the present invention provides a resilient, annular pipe gasket for forming a seal between an annular rib provided on a radially outer surface of a first pipe and a radially inner surface of a second pipe, the rib having a radially outer surface, an axially forward side facing the end of the first pipe and an opposite axially rearward side, the first pipe and the second pipe being adapted to mate with a portion of the first pipe having the annular rib being received in the second pipe, the pipe gasket comprising:

(a) a sealing base having a radially inner surface and a radially outer surface provided with sealing means;

(b) a forward leg extending radially inwardly from an axially forward portion of the base; and (c) a flap extending radially outwardly and axially forwardly from a radially inner portion of the forward leg, the flap having a pipe engaging surface at a radially outer portion of the flap, wherein a first radial distance between the radially inner surface of the base and a radially outermost portion of the sealing means is greater than a second radial distance between the radially inner surface of the base and the pipe engaging surface of the flap, and wherein the first radial distance is less than a third radial distance between the radially inner portion of the forward leg and the pipe engaging surface.

In yet another one of its broad aspects, the present invention provides a pipe connection, comprising:

an end portion of a first pipe having a radially outer surface provided with an annular rib, the rib having a radially outer surface, an axially forward side facing the end of the first pipe and an opposite axially rearward side;

an end portion of a second pipe in which the end portion of the first pipe is received; and a resilient, annular pipe gasket comprising:

(a) a base forming a seal between the radially outer surface of the rib of the first pipe and a first radially inner surface of the second pipe, the base having a radially inner surface seated on the radially outer surface of the rib, and a radially outer surface seated on the radially outer surface of the rib, and a radially outer surface provided with sealing means which sealingly engage the first radially inner surface of the second pipe;

(b) a forward leg extending radially inwardly from the base along the axially forward side of the rib; and (c) a flap extending radially outwardly from a radially inner portion of the forward leg and axially forwardly toward the end of the first pipe, the flap having an engaging surface at a radially outer portion of the flap, the engaging surface engaging a second radially inner surface of the second pipe.

BRIEF DESCRIPTION OF THE DRAWINGS

Further aspects and advantages of the present invention will become apparent from the following description, taken together with the accompanying drawings, in which.

DETAILED DESCRIPTION OF THE PREFERRED EMBODIMENTS

Preferred embodiments of the present invention are now described with reference to FIGS. 1 to 4.

Figure 1:
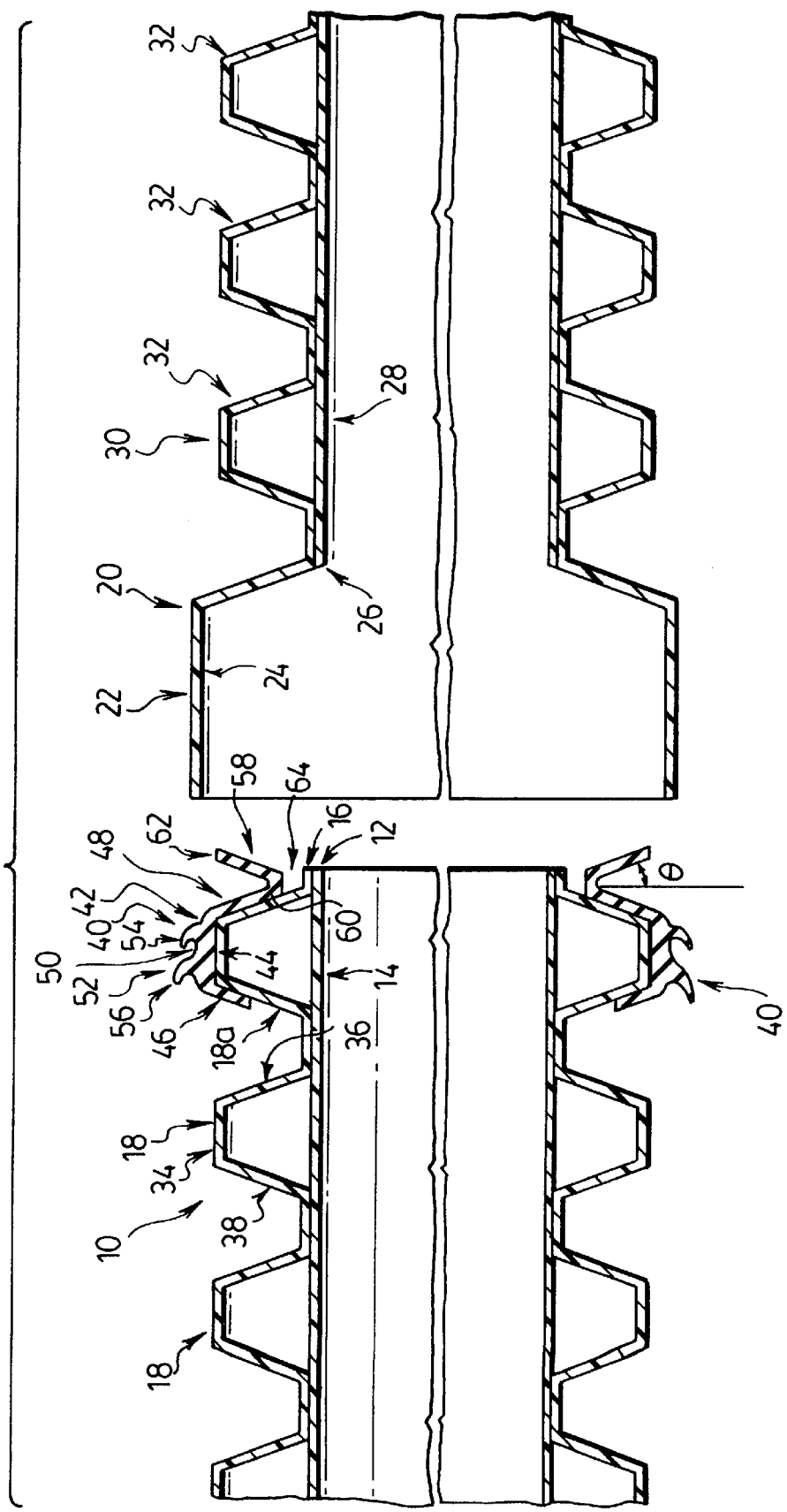
FIG. 1 is a cross-sectional view of a gasket according to the present invention received on a first pipe, prior to insertion of the first pipe into the bell of a second pipe.

FIG. 1 is a cross-sectional view in the longitudinal direction illustrating an end of a first pipe 10 having two layers, an inner layer 12 having a smooth inner surface 14 and an outer corrugated layer 16 having a plurality of circumferential, outwardly extending ribs 18. In a typical application of the present invention, first pipe 10 is a drain or sewer pipe to be buried in soil, for example along a highway.

The layers 12 and 16 of first pipe 10 are relatively thin and are preferably made of a plastic material such as polyethylene. The provision of ribs 18 in corrugated layer 16 increases the rigidity of first pipe 10.

The first pipe 10 is adapted to mate with second pipe 20. The end of first pipe 10 shown in FIG. 1 is adapted to be received in the end of a second pipe 20. As shown in FIG. 1, second pipe 20 has an enlarged bell 22 with a smooth inner surface 24 into which the end of first pipe 10 is inserted. Second pipe 20 is typically of the same or similar construction as first pipe 10, comprising inner layer 26 having a smooth inner surface 28, and outer corrugated layer 30 having circumferential, outwardly extending ribs 32.

As may be appreciated, pipes 10 and 20 are more typically of identical construction. That is, the end of first pipe 10 opposite to that shown in FIG. 1 typically has a bell identical to bell 22 of second pipe 20. Similarly, the end of second pipe 20 opposite to that shown in FIG. 1 is typically identical to the end of first pipe 10 shown in FIG. 1. Furthermore, although the drawings show two pipes 10 and 20 being joined, it is to be appreciated that one or both of pipes 10 and 20 could be replaced by a fitting such as an elbow or a "T". Therefore, it must be understood that "pipe" as used herein includes fittings such as, for example, couplings, elbows, "T"'s, "Y"'s and adaptors.

Typically, pipes such as pipes 10 and 20 are produced in various sizes. One common size is pipes 10 and 20 with an inside diameter of about 30 inches. The following description will be given with reference to this size of pipe. However, it must be remembered that this description is merely an example and applies to other sizes of pipe with suitable variations. Typically, the clearance between the top of a rib 18 and the inner surface 24 of the bell 22 is from about 0.2 inches to about 0.6 inches, with an average clearance of about 0.4 inches.

For convenience, the rib 18 closest to the end of first pipe 10 shown in FIG. 1 is labelled 18a. However, it is to be appreciated that rib 18a is typically identical to the other ribs 18 of first pipe 10.

Ribs 18 are shown in FIG. 1 as having a truncated, conical cross section, with a flat, horizontal outer surface 34, a forwardly-sloped face 36 and a rearwardly-sloped face 38. Although ribs 18 are shown in FIG. 1 as having a truncated conical shape, it is to be appreciated that ribs 18 may be of other preferred shapes. For example, the ribs may be rounded or more rectangular.

Figure 2:
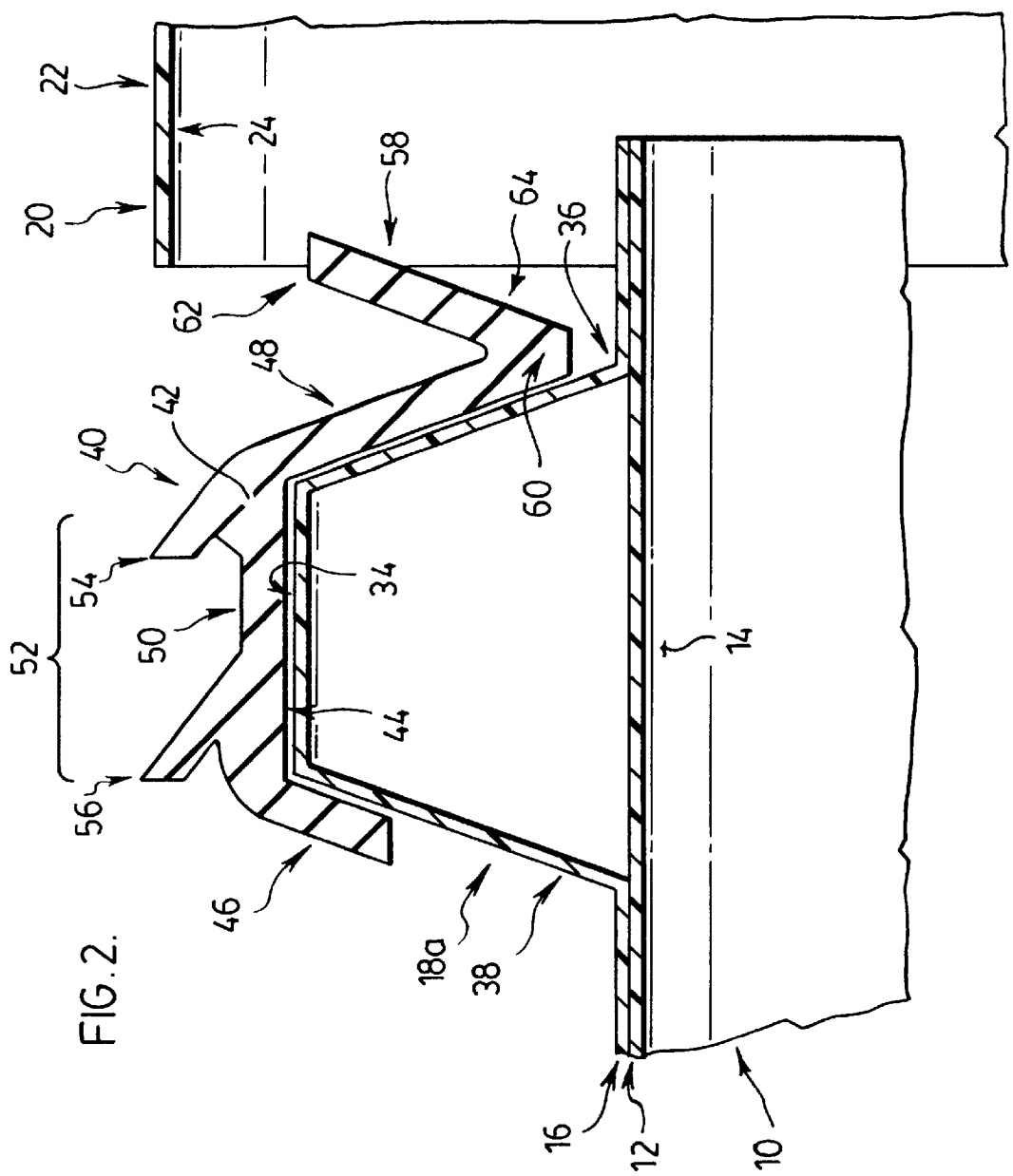
FIG. 2 is a close-up of the cross-sectional view shown in FIG. 1.

As shown in FIG. 1, seated on endmost rib 18a of pipe 10 is a preferred gasket 40 according to the present invention. An enlarged, longitudinal cross-sectional view of the gasket of FIG. 1 is shown in FIG. 2.

The inventors have appreciated that it is preferred to position gasket 40 on top of a rib 18 because that location is the most rigid point on the outer surface of pipe 10. Positioning gasket 40 on the most rigid point of pipe 10 reduces the amount of bending of pipe 10 caused by compression of gasket 40.

Although gasket 40 is shown in FIG. 1 as being received on top of endmost rib 18a of pipe 10, it is to be appreciated that this may not necessarily be the case. Gasket 40 may be received on any rib 18 which will be received inside bell 22 when pipes 10 and 20 are joined.

Gasket 40 has a base 42 which is shaped to be seated on rib 18a. This helps to prevent displacement of gasket 40 from the top of rib 18 prior to installation and joining of the pipes, as well as preventing displacement of gasket 40 from the top of rib 18 during and after installation.

In the embodiment of the invention illustrated in FIG. 1, base 42 has an inner surface 44 which is flat and is adapted to be received on top of rib 18a having flat outer surface 34.

The gasket 40 preferably comprises a rearward leg 46 extending inwardly along the rearwardly-sloped face 38 of rib 18a, and a forward leg 48 extending inwardly along the forwardly-sloped face 36 of rib 18a.

Although gasket 40 is shown in the drawings as having a rearward leg 46, it is to be appreciated that gaskets according to the present invention may be provided which do not have a rearward leg such as leg 46. The primary function of rearward leg 46 is to prevent displacement of gasket 40 from the top of rib 18a prior to installation, for example by handling of the pipe 10 during loading and unloading from transportation vehicles.

The base 42 of gasket 40 has an outer surface 50 on which is provided sealing means 52 adapted to engage the inner surface 24 of bell 22 as pipe 10 is inserted into bell 22. Therefore, the sealing means 52 preferably extends outwardly (in the radial direction) from the outer surface 50 of base 42 a sufficient distance to engage inner surface 24 of bell 22 as pipe 10 is inserted inside pipe 20.

In the preferred embodiment of gasket 40 shown in FIG. 1, the sealing means 52 comprises two resilient arms 54, 56 spaced from one another and extending outwardly from the outer surface 50 of base 42. Preferably, as shown in FIG. 1, both the forward arm 54 and the rearward arm 56 are directed rearwardly (in the longitudinal direction) away from the bell 22 of second pipe 20. Preferably, rearward arm 56 extends outwardly from the base 42 further than the forward arm 54.

Most preferably, the thickness of base 42 from inner surface 44 to outer surface 50 is less than the clearance between outer surface 34 of rib 18a of first pipe 10 and the inner surface 24 of bell 22 of second pipe 20.

In a particularly preferred embodiment of the present invention for application to pipes having about 30 inch diameters, the thickness of base 42 of gasket 40, measured from inner surface 44 to outer surface 50, is from about 0.25 inches to about 0.35 inches.

Preferably, the radial distance or height of resilient arms 54 and 56, measured as the distance from the inner surface 44 of gasket 40 to the outermost portions of resilient arms 54 and 56, is such that arms 54 and 56 will be in a compressed state after pipe 10 is inserted into pipe 20. Therefore, the total radial distance or height of resilient arms 54 and 56 together with the thickness of base 42 is greater than the clearance between the outer surface 34 of rib 18 and the inner surface 24 of bell 22.

The resilient arms 54, 56 are adapted to sealingly engage the inner surface of pipe 20. Sometimes only a soil-tight seal is required between pipes 10 and 20, and sometimes a water-tight seal is required. For example, in highway drainage systems, it is not usually necessary to have a water-tight seal between pipes, which are typically buried in soil. However, soil must be prevented from entering the pipes.

Although FIG. 1 illustrates sealing means 52 comprising two resilient arms 54 and 56, it is to be appreciated that sealing means of numerous other shapes and configurations may be used. For example, the sealing means may be in the form of rectangular or rounded projections extending from the outer surface 50 of base 42. Alternatively, the sealing means may comprise one resilient arm similar to arm 54 or 56, or may comprise more than two such arms or projections.

Gasket 40 shown in FIG. 1 further comprises a flap 58 extending outwardly (in the radial direction) and forwardly from an inner (in the radial direction) portion 60 of forward leg 48. The operation of flap 58 is now described with reference to FIGS. 3 and 4, illustrating the insertion of first pipe 10 into second pipe 20.

Figure 3:
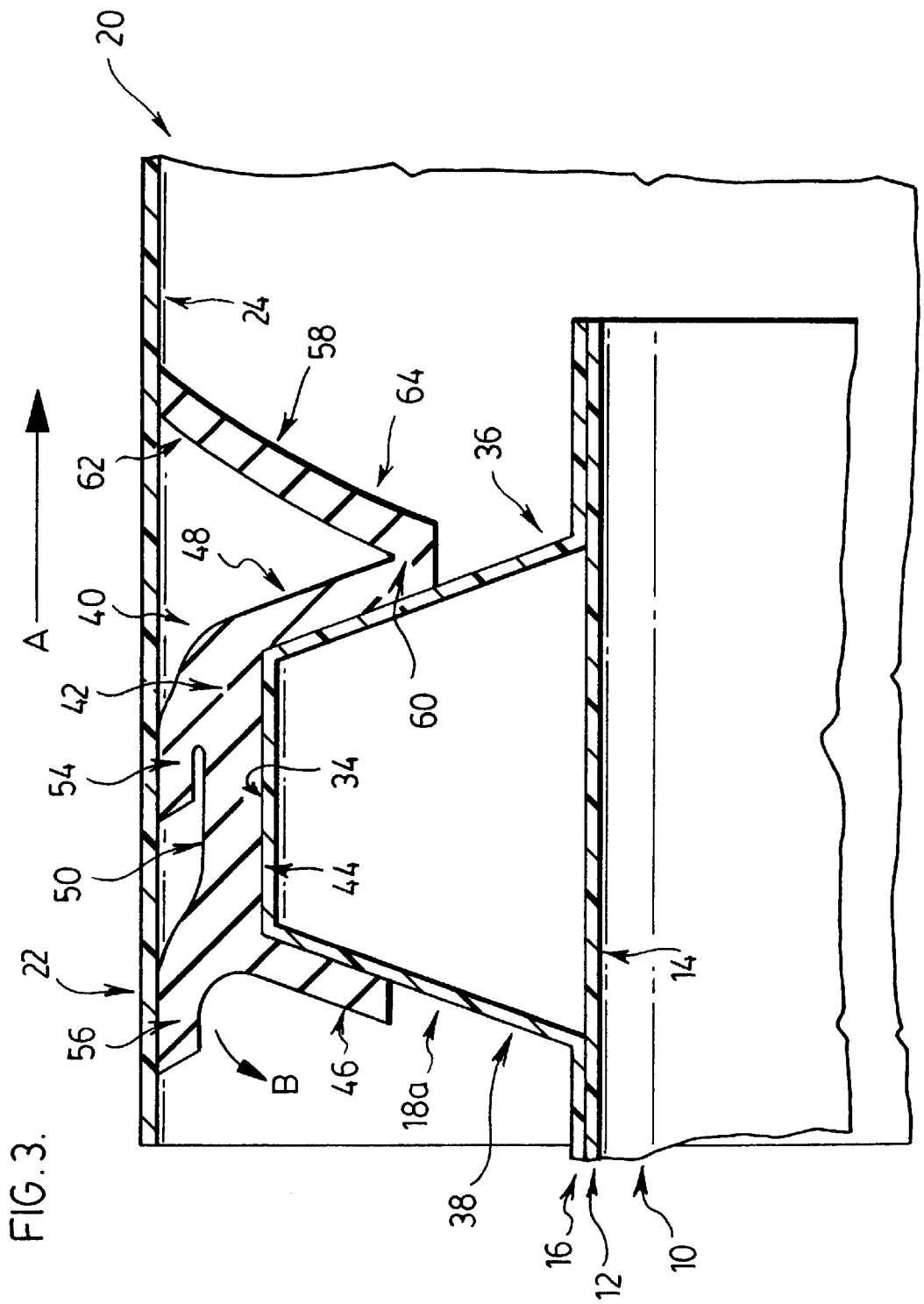
FIG. 3 is a close-up of the gasket of FIG. 2 when the first pipe is partially inserted into the second pipe.
Figure 4:
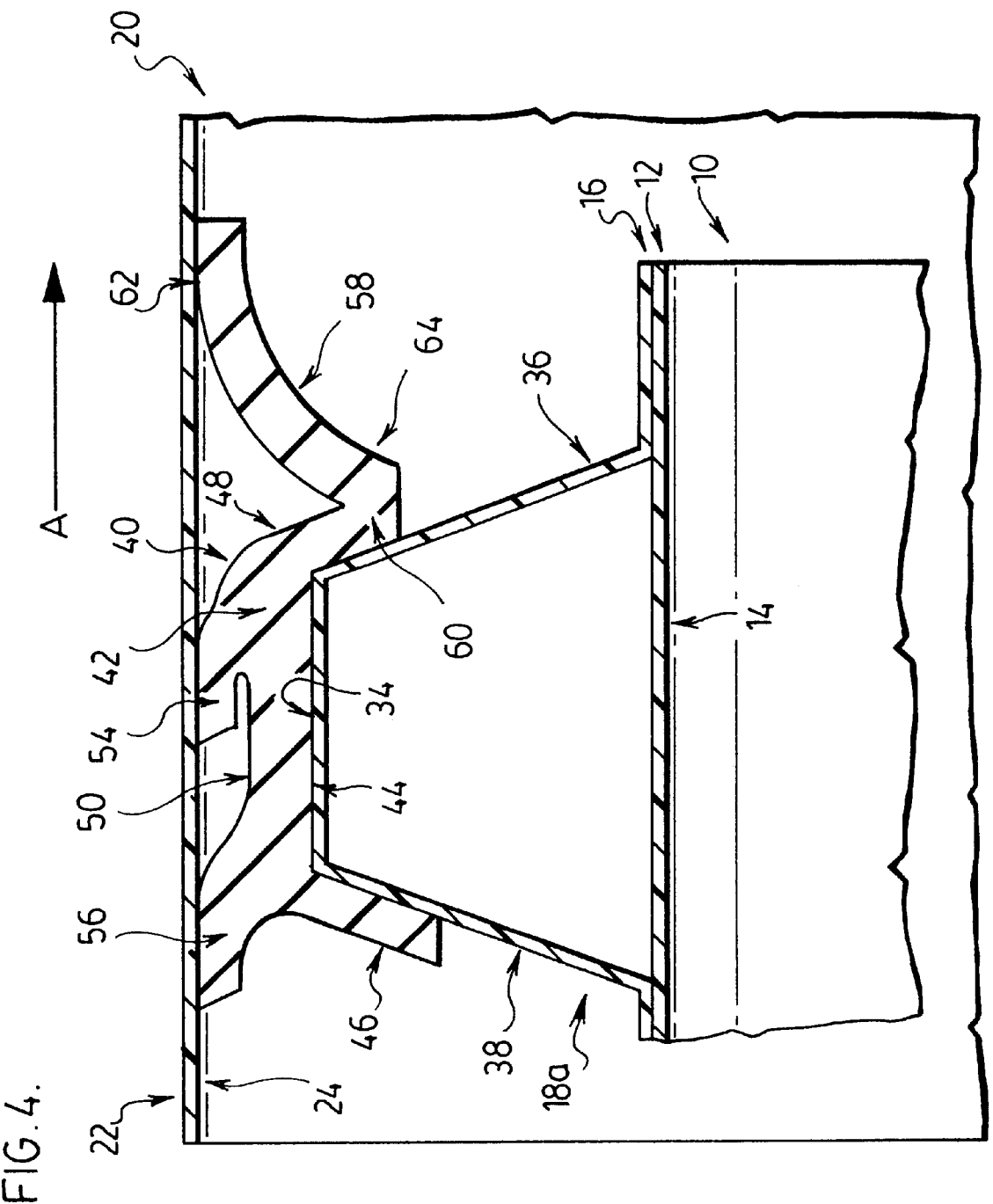
FIG. 4 is a close-up of the gasket of FIG. 2 when the first pipe is completely inserted into the second pipe.

In FIG. 3, pipe 10 is being inserted in a forward direction into bell 22 of pipe 20. The forward direction is shown by arrow A. Of course, the actual movement is relative in that pipe 20 could be moved in the rearward direction or both pipes 10 and 20 could be moved towards each other.

As shown in FIG. 3, once arms 54 and 56 make contact with inner surface 24 of bell 22, they are bent rearwardly and compressed inwardly. Further forward advancement of pipe 10 relative to pipe 20 will be resisted by the friction on the inner surface 24 of bell 22 by arms 54 and 56. As may be appreciated, this frictional resistance to forward movement of pipe 10 into pipe 20 is increased with increasing compression in the radial direction of the gasket 40.

This frictional contact between resilient arms 54 and 56 on inner surface 24 of bell 22 results in a rearwardly directed force being exerted on gasket 40. This rearward force causes gasket 40 to be pushed in a rearward direction relative to pipe 10. Because the base 42 of gasket 40 is seated on rib 18a, this rearward force on gasket 40 is transferred into rotational displacement of the gasket 40 relative to and about rib 18a, in the direction indicated by arrow B in FIGS. 3 and 4.

FIG. 4 illustrates (with exaggeration) the position of gasket 40 after some rotational displacement of gasket 40 has taken place. Specifically, base 42 of gasket 40 is pushed rearwardly over outer surface 34 of rib 18. This causes rearward leg 46 of gasket 40 to be pushed inwardly radially over the rearwardly-sloped face 38 of rib 18a, and also causes forward leg 48 to advance outwardly radially along the forwardly-sloped face 36 of rib 18a.

As a result of this rearward rotational movement of gasket 40, an outer engaging surface 62 of flap 58 is brought into engagement with the inner surface 24 of bell 22. The engaging surface 62 of flap 58 is shown in FIG. 4 as the rearward surface of the outermost (in the radial direction) tip of flap 58.

Flap 58 extends radially outwardly a sufficient distance such that engaging surface 62 engages inner surface 24 of bell 22 during rotation of gasket 40 about rib 18a. Preferably, engaging surface 62 does not extend radially outwardly so far as to be moved rearwardly during joining of pipes 10 and 20. Therefore, the radial distance between the inner surface 44 of base 42 and the engaging surface 62 of flap 58 is less than the clearance between the outer surface 34 of rib 18a and the inner surface 24 of bell 22. Furthermore, the resilient arms 54 and 56 of sealing means 52 extend radially outwardly further than the engaging surface 62 of flap 58. Most preferably, flap 58 does not extend radially outwardly past the inner surface 44 of gasket 40, such that engaging surface 62 is located radially inward of, or at the same radial distance as, inner surface 44 of gasket 40.

It is to be appreciated that, as the clearance between the outer 34 of ribs 18 and the inner surface 24 of bell 22 approaches the radial distance or height of the resilient arms 54 and 56, the degree of compression of resilient arms 54 and 56 is relatively small and may result in little or no rotation of gasket 40 relative to rib 18a. In this situation, pipe 10 may be completely inserted into bell 22 without flap 58 contacting or engaging the inner surface 24 of bell 22.

As shown in the drawings, the forward leg 48 and the flap 58 of gasket 40 together define a V-shaped member 64. The V-shaped member 64 helps to prevent rotational displacement of gasket 40 relative to rib 18a, whether caused by friction during joining of pipes 10 and 20, or caused by fluid pressure within pipes 10 and 20 after they are joined.

Although the precise reasons why gasket 40 is able to carry out this function are not fully understood, the following is the current understanding.

FIG. 4 shows gasket 40 as having been rotated rearwardly relative to rib 18a, either by frictional forces during installation as discussed above or by fluid pressure within pipes 10 and 20 after installation. In the orientation of gasket 40 shown in FIG. 4, both sealing means 52 and engaging surface 62 are in frictional engagement with inner surface 24 of bell 22.

Rearwardly directed forces applied to gasket 40 may cause V-shaped member 64 to open such that a distance between the engaging surface 62 of flap 58 and the base 42 of gasket 40 increases. However, V-shaped member 64 has sufficient rigidity that it is resists being opened to such a degree that it may be forced through the opening between the rib 18a and the inner surface 24 of bell 22.

As discussed above, V-shaped member 64 may be caused to open by rearwardly directed forces acting on gasket 40, for example frictional forces caused by joining of pipes 10 and 20, or possibly rearward forces caused by fluid pressure within pipes 10 and 20 after installation. However, V-shaped member 64 may also be caused to open by radially outwardly directed forces caused by fluid pressure within pipes 10 and 20 after installation of pipes 10 and 20.

There may be some small amount of further rearward displacement of gasket 40 due to opening of V-shaped member 64. However, this further rearward rotation of gasket 40 will not result in displacement of gasket 40 from the top of rib 18a. Therefore, V-shaped member 64 prevents gasket 40 from becoming displaced from rib 18a during joining of pipes 10 and 20 and also prevents gasket 40 from becoming displaced, or "blown out", from between pipes 10 and 20 by relatively high water pressures.

Another mechanism exists which may contribute to the resistance of rearward displacement of gasket 40. Since flap 58 is positioned forwardly of rib 18a, it may preferably bias forward leg 48 rearwardly against forwardly-sloped face 36 of rib 18a in response to a rearwardly directed force exerted on gasket 40. This rearwardly directed force may be caused either by insertion of pipe 10 into pipe 20, or by water pressure within pipes 10 and 20 after installation. This biasing of forward leg 48 against forwardly-sloped face 36 or rib 18a is believed to contribute to preventing substantial rearward displacement of base 42 of gasket 40 relative to rib 18a after engagement of engaging surface 62 of flap 58 with inner surface 24 of bell 20.

Although not necessary, flap 58 preferably serves the additional function that the additional contact provided by engagement of engaging surface 62 with inner surface 24 of bell 22 provides an additional seal, and preferably a watertight seal, between pipe 10 and pipe 20.

Preferably, the angle θ of flap 58 relative to a vertical plane, as shown in FIG. 1, is from about 20° to about 60°. However, it is to be appreciated that the flap may be at any angle so long as the engaging surface 62 of flap 58 makes contact with the inner surface 24 of bell 22 to prevent rotation of gasket 40 relative to rib 18.

Gasket 40 may preferably be unitarily formed, for example by extrusion and splicing, or by molding. However, it may also be preferred to provide a gasket 40 comprising materials of different rigidity. For example, the sealing means 52 is preferably relatively compressible to form a seal with the inner surface 24 of bell 22 without causing the bell 22 to bulge. On the other hand, it is desirably that the V-shaped member 64 is made of more rigid material which is more difficult to stretch and compress, so that the flap 58 prevents rearward rotation of the gasket.

When gasket 40 is unitarily formed from a single material, the V-shaped member 64 comprising flap 58 and forward leg 48 is preferably thicker than the rearward leg 46. For example, in one preferred embodiment for a gasket 40 for a 30-inch diameter pipe, V-shaped member 64 has a thickness of from about 0.20 to about 0.25 inches, whereas rearward leg has a thickness of about 0.16 inches.

Preferably, the gasket is made of rubber or an elastomeric material including thermoplastic elastomers (TPE's), thermoplastic rubber, flexible polyvinyl chloride and thermosetting elastomers.

Although the invention has been described in connection with certain preferred embodiments, it is not intended to be limited thereto. Rather, it is intended that the invention cover all alternative embodiments as may be within the scope of the following claims.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

What is claimed is:

1. A resilient, annular pipe gasket for forming a seal between an annular rib provided on a radially outer surface of a first pipe and a radially inner surface of a second pipe, the rib having a radially outer surface, an axially forward side facing the end of the first pipe and an opposite axially rearward side, the first pipe and the second pipe being adapted to mate with a portion of the first pipe having the annular rib being received in the second pipe, the pipe gasket comprising:

(a) a sealing base having a radially inner surface and a radially outer surface provided with sealing means;

(b) a forward leg extending radially inwardly from an axially forward portion of the base; and (c) a flap extending radially outwardly and axially forwardly from a radially inner portion of the forward leg, the flap having a pipe engaging surface at a radially outer portion of the flap, wherein a first radial distance between the radially inner surface of the base and a radially outermost portion of the sealing means is greater than a second radial distance between the radially inner surface of the base and the pipe engaging surface of the flap, and wherein the first radial distance is less than a third radial distance between the radially inner portion of the forward leg and the pipe engaging surface.

2. The resilient pipe gasket of claim 1, wherein the forward leg and the flap together define a V-shaped member.

3. The resilient pipe gasket of claim 1, wherein the sealing means comprises two resilient arms axially spaced from one another and extending radially outwardly from the radially outer surface of the base.

4. The resilient pipe gasket of claim 3, wherein the two resilient arms are directed axially rearwardly.

5. The resilient pipe gasket of claim 3, wherein the two resilient arms comprise an axially forward arm and an axially rearward arm, wherein a first distance measured radially outwardly from the radially inner surface of the base to a radially outermost portion of the rearward arm is greater than a second distance measured radially outwardly from the radially inner surface of the base to a radially outermost portion of the forward arm.

6. The resilient pipe gasket of claim 1, additionally comprising a rearward leg extending radially inwardly from the base.

7. The resilient pipe gasket of claim 1, wherein the radially inner surface of the base is flat.

8. The resilient pipe gasket of claim 1, wherein the pipe gasket is comprised of a material selected from rubber and elastomeric materials selected from the group comprising thermoplastic elastomers (TPE's), thermoplastic rubbers, flexible polyvinyl chloride and thermosetting elastomers.

9. A pipe connection, comprising:

an end portion of a first pipe having a radially outer surface provided with an annular rib, the rib having a radially outer surface, an axially forward side facing the end of the first pipe and an opposite axially rearward side;

an end portion of a second pipe in which the end portion of the first pipe is received; and a resilient, annular pipe gasket comprising:

(a) a base forming a seal between the radially outer surface of the rib of the first pipe and a first radially inner surface of the second pipe, the base having a radially inner surface seated on the radially outer surface of the rib, and a radially outer surface seated on the radially outer surface of the rib, and a radially outer surface provided with sealing means which sealingly engage the first radially inner surface of the second pipe;

(b) a forward leg extending radially inwardly from the base along the axially forward side of the rib; and (c) a flap extending radially outwardly from a radially inner portion of the forward leg and axially forwardly toward the end of the first pipe, the flap having an engaging surface at a radially outer portion of the flap, the engaging surface engaging a second radially inner surface of the second pipe.

10. The pipe connection of claim 9, wherein the forward leg and the flap together define a V-shaped member.

11. The pipe connection of claim 10, wherein the flap biases the forward leg axially rearwardly against the axially forward side of the rib.

12. The pipe connection of claim 9, wherein the engaging surface at the radially outer portion of the flap engages the second radially inner surface of the second pipe.

13. The pipe connection of claim 9, wherein the engaging surface at the radially outer portion of the flap sealingly engages the second radially inner surface of the second pipe.

14. The pipe connection of claim 9, wherein the sealing means comprises two resilient arms axially spaced from one another and extending radially outwardly from the radially outer surface of the base.

15. The pipe connection of claim 14, wherein the two resilient arms are directed axially rearwardly.

16. The pipe connection of claim 14, wherein the two resilient arms comprise an axially forward arm and an axially rearward arm.

17. The pipe connection of claim 9, additionally comprising a rearward leg extending radially inwardly from the base and extending along the axially rearward side of the rib.

18. The pipe connection of claim 9, wherein the radially inner surface of the base and the radially outer surface of the rib are flat, and the radially inner surface of the base is received on the radially outer surface of the rib.

19. The pipe connection of claim 9, wherein the pipe gasket is comprised of a material selected from rubber and elastomeric materials selected from the group comprising thermoplastic elastomers (TPE's), thermoplastic rubbers, flexible polyvinyl chloride and thermosetting elastomers.

* * * * *